July 4, 1944. G. N. VERNON 2,352,871
PARACHUTE
Filed March 24, 1942
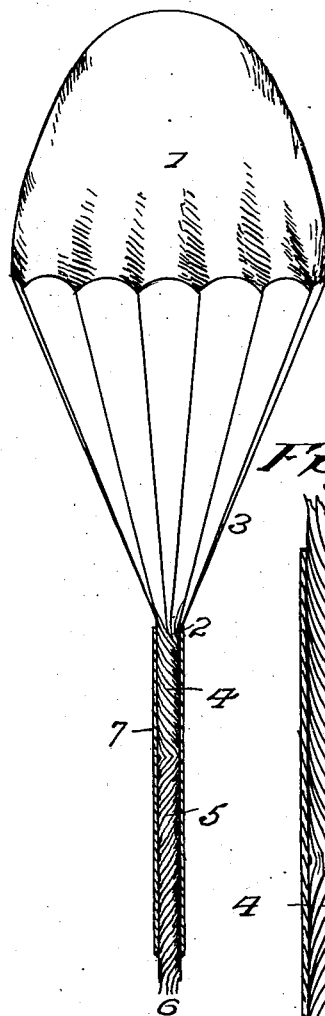
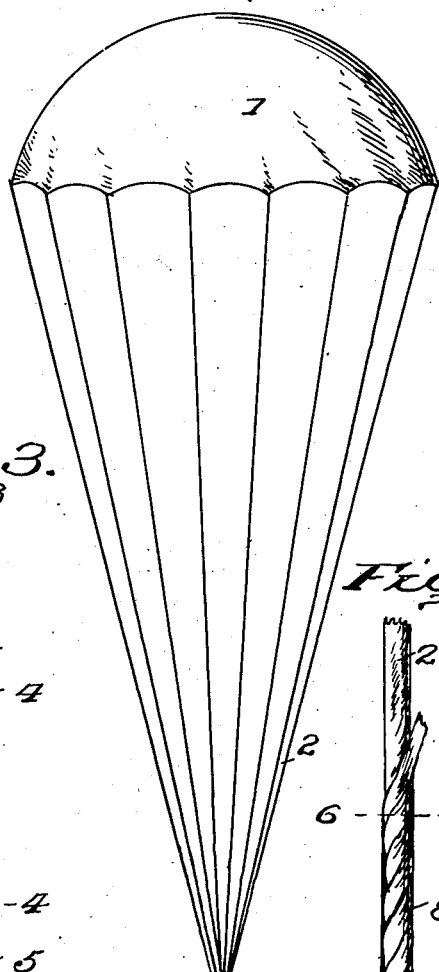
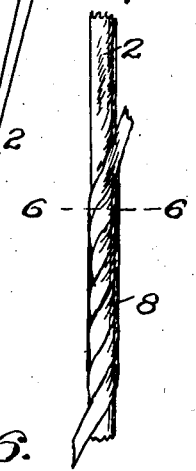
Inventor
George N. Vernon
By
Attorney Patented July 4, 1944

2,352,871

UNITED STATES PATENT OFFICE 2,352,871

PARACHUTE

George N. Vernon, San Francisco, Calif.

Application March 24, 1942, Serial No. 436,033

7 Claims. (Cl. 244—142)

This invention is directed to a method of and means for improving parachutes, and more particularly to retard the complete opening of the parachute following action of the rip cord to avoid the usual severe jerk to the parachutist incident to the usual sudden and complete opening of the canopy.

In the use of a parachute, particularly in delayed operation of the rip cord, extreme speed has been gained before the canopy opens, and the occupant is subjected to a severe jerk and shock, which is of course objectionable. If the opening of the canopy can be made gradually progressive, the shock and jerk will be correspondingly reduced and substantially eliminated as to objectionable influence.

Of course, the parachute is secured to the back of the operator in a compact bundle-like form, and automatically opens when the rip cord is pulled, and any means to insure a gradual opening of the canopy must avoid any material increase in the weight of the parachute or any detail necessitating a material change in the form and compactness of the bundled parachute, to particularly avoid any uncertainty in sufficiently rapid and complete function of the parachute.

The method consists in so initially shortening or restricting the normal full free lengths of the shroud lines of the parachute that the parachute in its initial opening is prevented from full spread, in order to avoid the severity of the shock and jar to the user as the parachute initially functions; the method essentially including that the shroud-shortening or length-restricting means will automatically yield under air checking of the parachute to gradually increase the free lengths of the shroud lines to their normal free lengths.

The primary object of the present invention is to control the relation of the supporting cords between the canopy and body harness as to limit the length of such cords immediately freed on action of the rip cord and thus limit the initial spread of the canopy to provide a supporting means less than that of the full capacity of the canopy, and through this partial spread of the canopy, very materially reduce the initial check or jerk on the occupant.

A further object of the invention is to so cooperate or associate the lengths of cord, or more particularly definite portions of such lengths, beyond the cord lengths immediately freed on action of the rip cord, to compel a retarded freeing of such additional lengths of cords to insure that a full opening of the canopy, incident to a complete freeing of the full lengths of the shroud lines, will occur gradually, but sufficiently rapid to insure effective parachute operation, to thus materially avoid the usual shock and jerk on the occupant in conventional parachute opening.

The invention is illustrated in the accompanying drawing, in which:

Figure 1 is an elevation of a parachute involving the invention and showing the canopy spread as permitted by the free lengths of the lines, the remaining lengths of the lines being arranged in accordance with the invention.

Figure 2 is a similar view showing the parachute in fully-opened form.

Figure 3 is an enlarged elevation, showing the preferred arrangement of the controlled lengths of the lines.

Figure 4 is a section of the same on the line 4—4 of Figure 3.

Figure 5 is a view similar to Figure 3, showing a slightly modified arrangement.

Figure 6 is a section on line 6—6 of Figure 5.

In the drawing, 1 represents the canopy and 2 the shroud lines leading therefrom to the body harness (not shown). The parts in these particulars are conventional and any accepted type and form is contemplated.

A definite length 3 of the supporting lines 2 leading directly from the canopy 1, are or remain as entirely free to permit possible canopy spread, the only limitation in this particular is that the lengths 3 of the lines, hereinafter termed the free lengths, must be such as in themselves to permit only a partial spread of the canopy 1. No limitation is intended as to any particular lengths of free lines or any particular restricted spread of the canopy, as the primary purpose is to restrict the initial spread of the canopy to such an extent less than its complete spread as to materially avoid the usual jerk and shock to the occupant, otherwise incident to the sudden and complete canopy spread of conventional operation.

A definite length of the lines 2, below the free lengths 3, are twisted together in one direction, as at 4, and immediately below the twisted length 4, the lines 2 are further but oppositely twisted, as at 5. The lengths 6 below the twisted lengths 5 may extend to the body harness straight unaffected lengths, though obviously held in close relation by reason of the twisted length 5.

Preferably, the lines throughout their twisted lengths are treated with an adhesive applied to each line of sufficient strength to hold the lines in twisted relation against their inherent tendency to untwist, and to insure that the lines of the twisted portions may gradually (at least not instantly) untwist under the suspended weight to gradually free the full length of the lines and the full opening of the canopy.

The particular length of the twisted portions 4 and 5 of the lines are intended to provide the result described, and are to be varied, if necessary, in particular types or uses of parachutes, to relative lengths to best accomplish the desired result. In order that the character of the adhesive may not cause the parts to stick together in the pack, the adhesively-treated lines, that is, the twisted portions, are covered with a protective layer or shield as 7, such as Cellophane or other easily rupturable material.

In view of the use of adhesive, the invention contemplates a modification, shown more particularly in Figures 5 and 6. Here each of the lines 2, below the free lengths 3, for a predetermined distance, are wrapped throughout or at appropriate intervals, with thin adhesive tape 8. The tape 8 adhesively adheres to each line and also exteriorly adhesive serves for holding the associated lines in compact relation when twisted until gradually separated under the increasing strain on such lines. In effect, the modification accomplishes the same purpose as the preferred form.

When the rip cord (not shown) is operated, the canopy I will instantly spread to the distention permitted by the free lines 3. The canopy is thus only partly distended, as indicated in Figure 1. Under the weight of the occupant and the tendency of the air resistance to fully open the canopy, the twisted lengths 4 and 5 are successively untwisted. Finally, the lines are free for their full lengths and the canopy fully open.

In the canopy opening initially permitted by the free lines 3, the air resistance is less than in the fully opened parachute, and hence the shock and jerk on the occupant under such initial and restricted opening of the canopy is materially less than in the sudden and fully opening of conventional operation. The continued spread of the canopy, following the initial opening, is gradual and obviously devoid of shock or jerk to the occupant. The reverse twisting of the line parts 4 and 5 prevents continuous spinning of the occupant in one direction only during opening of the canopy to further avoid discomfort.

What is claimed as new is:

1. A method of limiting the initial free opening of a parachute to a spread less than its full opening while permitting an immediate continuation of such initially-limited free opening to a full opening, consisting in intertwisting all shroud lines for a predetermined length into a compact unit form while leaving the shroud lines above and below the unit completely free from one another.

2. A method of limiting the initial free opening of a parachute to a spread less than its full opening while permitting an immediate continuation of such initially-limited free opening to a full opening, consisting in intertwisting all shroud lines for a predetermined length into a compact unit form, the intertwisting of the shroud lines in the unit being in relatively-opposite directions in the upper and lower portions of the unit respectively while leaving the shroud lines above and below the unit completely free from one another.

3. A method of limiting the initial free opening of a parachute to a spread less than its full opening while permitting an immediate continuation of such initially-limited free opening to a full opening, consisting in intertwisting all shroud lines for a predetermined length into a compact unit form, and connecting the shroud lines within the length of the unit against separating influence incident to their twisted strain.

4. A method of limiting the initial free opening of a parachute to a spread less than its full opening while permitting an immediate continuation of such initially-limited free opening to a full opening, consisting in intertwisting all shroud lines for a predetermined length into a compact unit form, the intertwisting of the shroud lines in the unit being in relatively-opposite directions in the upper and lower portions of the unit respectively while leaving the shroud lines above and below the unit completely free from one another, and connecting the shroud lines within the length of the unit against separating influence incident to their twisted strain.

5. A parachute including a canopy and shroud lines, the shroud lines for a predetermined length thereof having a unit form of intertwisted shroud-line lengths, the shroud lines above and below the unit being completely free from one another.

6. A parachute including a canopy and shroud lines, the shroud lines for a predetermined length thereof having a unit form of successive portions of relatively opposite intertwisted shroud-line lengths, the shroud lines above and below the unit being completely free from one another.

7. A parachute including a canopy and shroud lines, the shroud lines for a predetermined length thereof having a unit form of intertwisted shroud-line lengths, the shroud lines above and below the unit being completely free from one another, and adhesive connecting means uniting the shroud lines within the length of the unit to prevent casual untwisting.

GEORGE N. VERNON.